United States Patent
Yi et al.

(10) Patent No.: US 10,621,953 B2
(45) Date of Patent: Apr. 14, 2020

(54) METHOD FOR CONTROLLING DISPLAY REFRESH RATE AND ELECTRONIC DEVICE

(71) Applicant: Guangdong Oppo Mobile Telecommunications Corp., Ltd., Dongguan, Guangdong (CN)

(72) Inventors: Yongpeng Yi, Guangdong (CN);
Deliang Peng, Guangdong (CN);
Shengjun Gou, Guangdong (CN);
Xiaori Yuan, Guangdong (CN);
Gaoting Gan, Guangdong (CN);
Zhiyong Zheng, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/857,996

(22) Filed: Dec. 29, 2017

(65) Prior Publication Data

US 2018/0261190 A1 Sep. 13, 2018

(30) Foreign Application Priority Data

Mar. 10, 2017 (CN) .......................... 2017 1 0144382

(51) Int. Cl.
*G09G 5/30* (2006.01)
*G09G 5/18* (2006.01)
(Continued)

(52) U.S. Cl.
CPC ............. *G09G 5/30* (2013.01); *G06F 1/3212* (2013.01); *G06F 1/3218* (2013.01);
(Continued)

(58) Field of Classification Search
CPC .... G09G 5/30; G09G 5/18; G09G 2340/0435; G09G 5/363; G09G 2330/021; G06F 1/3212; G06F 1/3218; G06F 1/3265
See application file for complete search history.

(56) References Cited

U.S. PATENT DOCUMENTS 9,087,473 B1    7/2015 Walker
9,524,008 B1 *  12/2016 Woodall et al. ....... G09G 5/393
                 (Continued)

FOREIGN PATENT DOCUMENTS

CN         103151019 A     6/2013
CN         104091579 A     10/2014
                 (Continued)

OTHER PUBLICATIONS

Extended European search report issued in corresponding European application No. 17208974.0 dated Jun. 4, 2018.
(Continued)

*Primary Examiner* — Mark Edwards
(74) *Attorney, Agent, or Firm* — Young Basile Hanlon & MacFarlane, P.C.

(57) ABSTRACT

A method and an electronic device for controlling display refresh rate of an electronic device include operations as follows. When there is at least one foreground application currently running is a predefined application of a white list, a predefined refresh rate of the at least one foreground application is obtained and a target refresh rate of a display screen of the electronic device is determined according to the predefined refresh rate of the at least one foreground application. A frame buffer of the electronic device is controlled to send frame data to be displayed to the display screen at the same frequency as the target refresh rate.

20 Claims, 6 Drawing Sheets

(51) Int. Cl.
*G06F 1/3212* (2019.01)
*G06F 1/3218* (2019.01)
*G06F 1/3234* (2019.01)
*G09G 5/36* (2006.01)

(52) U.S. Cl.
CPC ............. *G06F 1/3265* (2013.01); *G09G 5/18* (2013.01); *G09G 5/363* (2013.01); *G09G 2330/021* (2013.01); *G09G 2340/0435* (2013.01)

(56) References Cited

U.S. PATENT DOCUMENTS

| | | |
|---|---|---|
| 2005/0138077 A1 | 6/2005 | Michael |
| 2013/0141642 A1* | 6/2013 | Wu ....................... G06F 3/1407 348/441 |
| 2014/0123269 A1* | 5/2014 | Drihem ............... H04L 63/0236 726/15 |
| 2014/0210801 A1 | 7/2014 | Li |
| 2014/0292785 A1* | 10/2014 | Segal ............... H04N 21/42653 345/522 |
| 2015/0177822 A1 | 6/2015 | Shoshan |
| 2016/0342406 A1* | 11/2016 | Ahmed .................. G06F 9/451 |
| 2016/0359666 A1 | 12/2016 | Ledwith et al. |
| 2017/0371394 A1* | 12/2017 | Chan ..................... G06F 1/3212 |

FOREIGN PATENT DOCUMENTS

| | | |
|---|---|---|
| CN | 104503655 A | 4/2015 |
| CN | 104731543 A | 6/2015 |
| CN | 104956443 A | 9/2015 |
| CN | 105788542 A | 7/2016 |

OTHER PUBLICATIONS

International search report issued in corresponding international application No. PCT/CN2018/073164 dated Apr. 3, 2018.
Office Action 1 issued in corresponding European application No. 17208974.0 dated Apr. 15, 2019.

* cited by examiner

METHOD FOR CONTROLLING DISPLAY REFRESH RATE AND ELECTRONIC DEVICE

CROSS-REFERENCE TO RELATED APPLICATION(S)

This application claims priority to Chinese Patent Application No. 201710144382.9, filed on Mar. 10, 2017, the content of which is hereby incorporated by reference in its entirety.

TECHNICAL FIELD

This disclosure relates generally to a display technical filed, and more particularly relates to a method for controlling display refresh rate of an electronic device, and the electronic device using the same.

BACKGROUND

Following the development of the terminal device, different kinds of terminal devices become more and more important for people's work and life. Usually, for a terminal device installing a certain operating system, display frames are refreshed frequently to represent different display image at different times.

Usually, a display refresh process of a terminal device, such as a mobile phone, may include an image render operation, an image compose operation, and an image display operation. In detail, each application, such as a desktop application, a video application, etc., first executes the image render operation to render a corresponding image, then executes the image compose operation to compose the image rendered by each application to one display frame, after the image render operation of all applicants have been finished; and then outputs the display frame to a display screen to finish the display. However, the usual display refresh process with some defects needed to be resolved.

SUMMARY

Implementations of the disclosure provide a method for controlling display refresh rate and an electronic device, which may improve the display refresh process by using a suitable display refresh rate.

The implementations of the disclosure provides a method for controlling display refresh rate of an electronic device, the method includes: obtaining a predefined refresh rate of at least one foreground application and determining a target refresh rate of a display screen of the electronic device according to the predefined refresh rate of the at least one foreground application, when there is at least one foreground application currently running is a predefined application of a white list; and controlling a frame buffer of the electronic device to send display frame data to be displayed to the display screen at the same frequency as the target refresh rate.

The implementations of the disclosure further provides an electronic device, the electronic device includes a display screen, a processor, and a memory, the memory stores a plurality of instructions, the plurality of instructions being executed by the processor and causing the processor to: obtain a predefined refresh rate of at least one foreground application and determine a target refresh rate of a display screen of the electronic device according to the predefined refresh rate of the at least one foreground application, when there is at least one foreground application currently running is a predefined application of a white list; and control a frame buffer of the electronic device to send display frame data to be displayed to the display screen at the same frequency as the target refresh rate.

The implementations of the disclosure further provides a non-transitory computer-readable storage medium, wherein the non-transitory computer-readable storage medium stores a plurality of instructions, when the plurality of instructions is executed by a computer, the computer is caused to execute a method for controlling display refresh rate, the method includes: obtain a predefined refresh rate of at least one foreground application and determine a target refresh rate of a display screen according to the predefined refresh rate of the at least one foreground application, when there is at least one foreground application currently running is a predefined application of a white list; and control a frame buffer to send display frame data to be displayed to the display screen at the same frequency as the target refresh rate.

According to the method, the electronic device, and the non-transitory computer-readable storage medium provided by implementations of the disclosure, the display refresh rate of the display screen of the electronic device may be determined more suitable.

DETAILED DESCRIPTION

The present disclosure will now be described in further detail with reference to the accompanying drawings and implementations, in which the objects, solutions, and advantages of the disclosure will become more apparent. It is to be understood that the specific implementations described herein are merely illustrative of the disclosure and are not intended to limit the disclosure. Furthermore, in order to facilitate to describe the disclosure, the drawings only show the structures related to the present disclosure, not all of the structures. Which should be referred to before detail discussing the implementations is that some implementations are described as processing or method as illustrated in flowcharts. Although the flowcharts describe the operations in a certain order, there are many operations of the flowcharts can be executed in parallel or simultaneously. Besides, the order of each operation can be alternated. When the last operation of one flowchart is executed completely, the processing of the flowchart can be terminated or can include additional operations not illustrated in the flowchart. The processing described in the flowchart can be corresponded to methods, functions, sub-process, etc.

Figure 1:
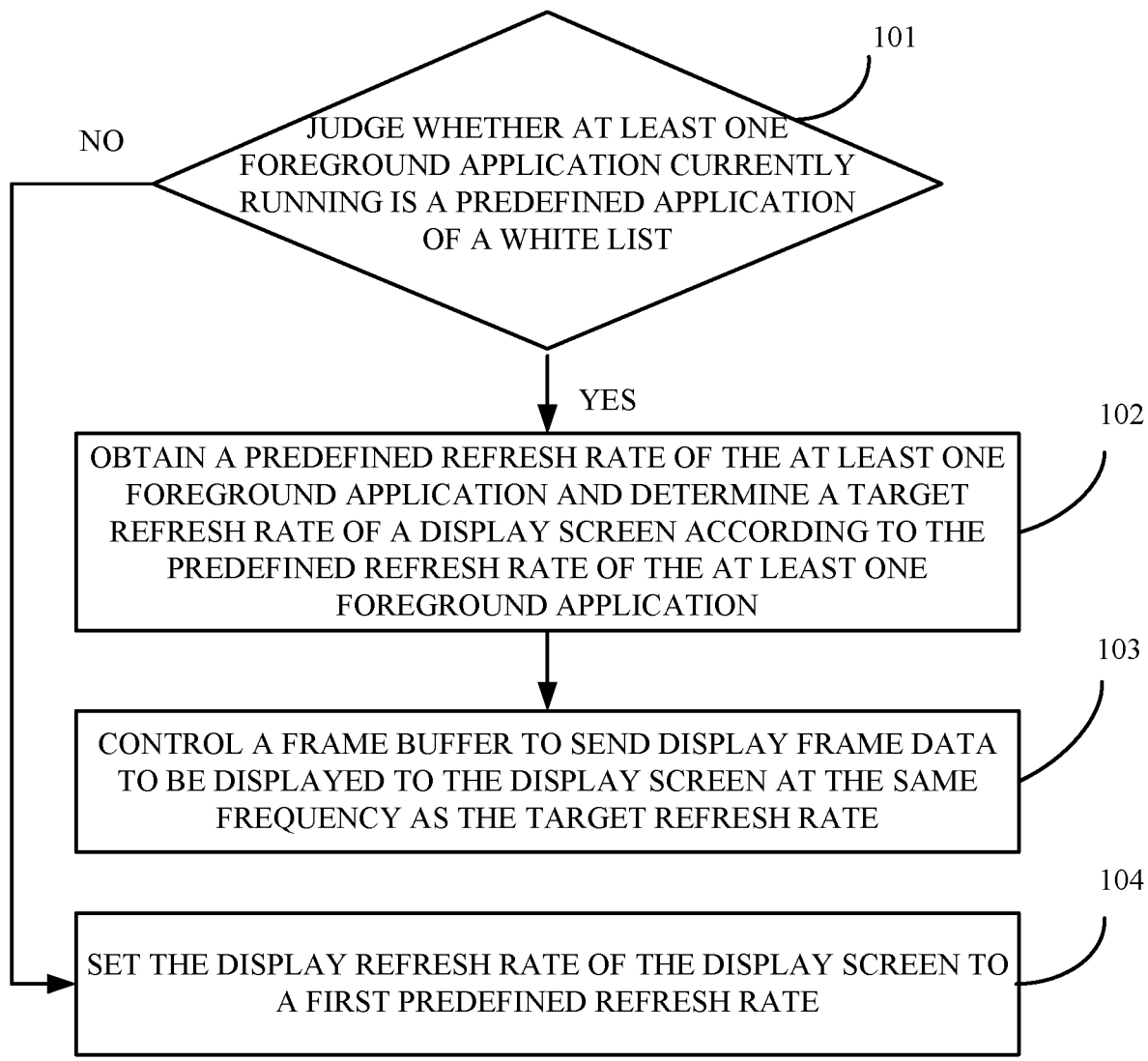
FIG. 1 is a flowchart illustrating a method for controlling display refresh rate, according to an implementation of the disclosure.
Figure 2:
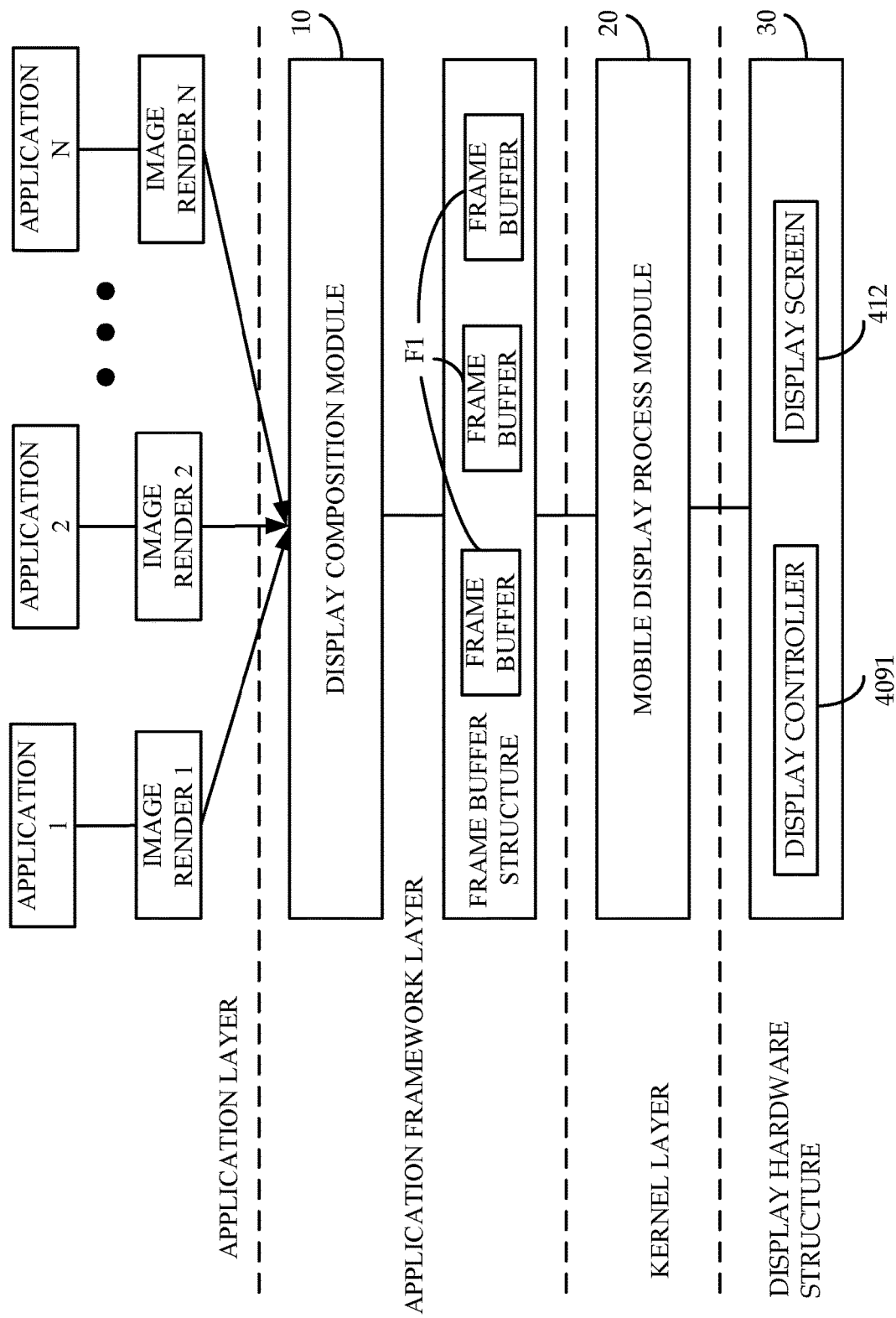
FIG. 2 is schematic diagram illustrating a display process of an electronic device and partial hardware and firmware structure of the electronic device, according to an implementation of the disclosure.
Figure 5:
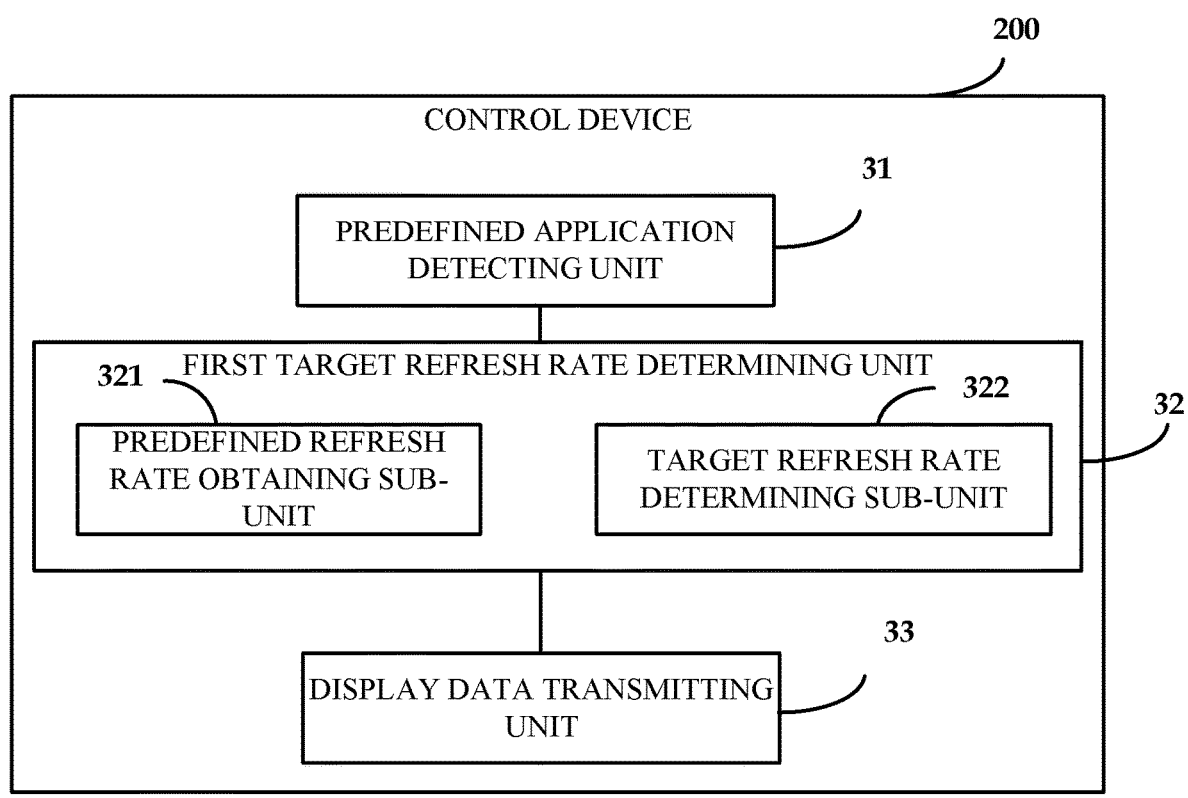
FIG. 5 is a block diagram of a control device for controlling display refresh rate, according to an implementation of the disclosure.
Figure 6:
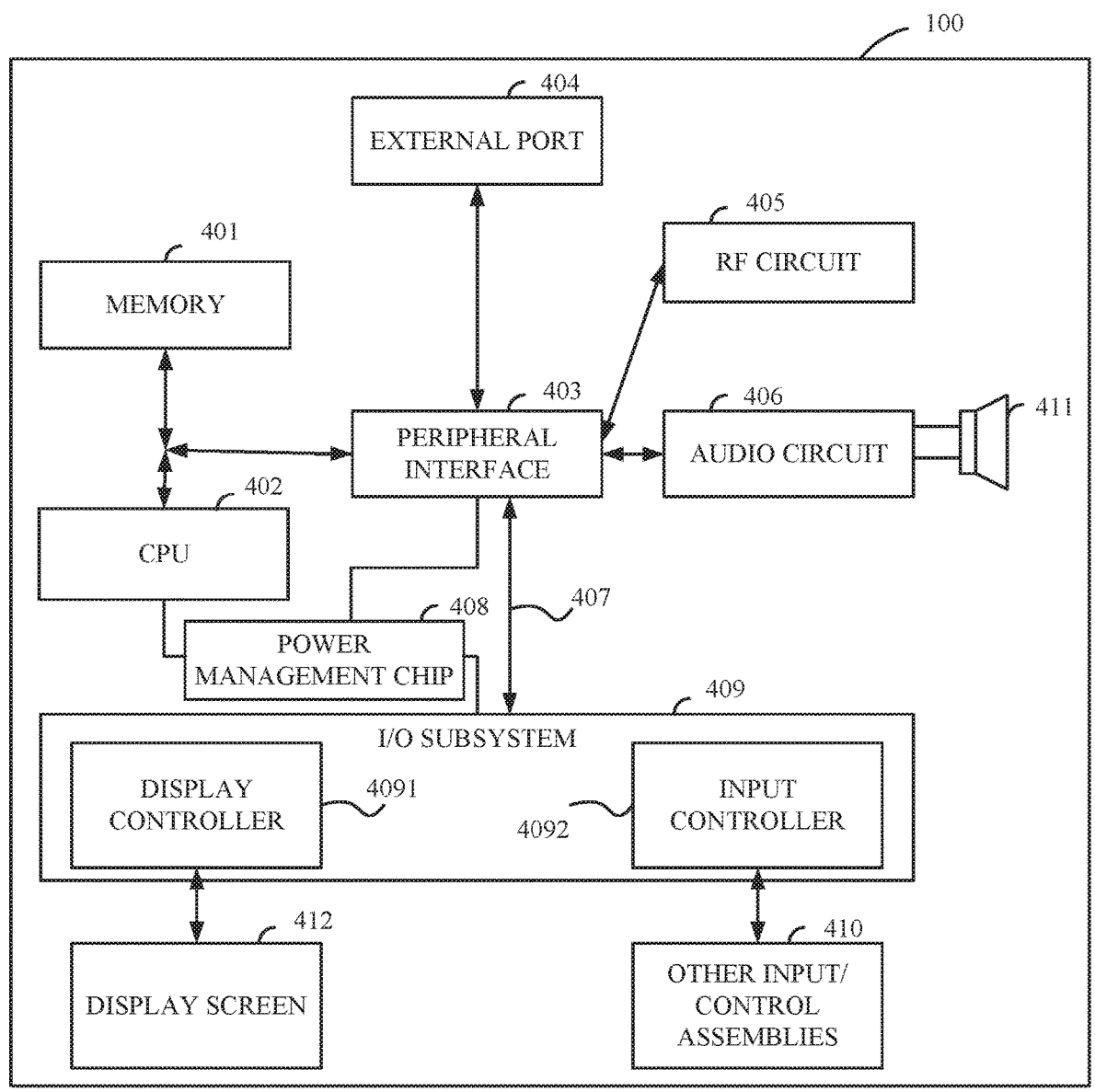
FIG. 6 is a structure diagram of an electronic device applying the method for controlling display refresh rate, according to an implementation of the disclosure.

FIG. 1 is a flowchart of a method for controlling display refresh rate of an electronic device, provided by an implementation of the disclosure. The method is applied to an electronic device 100 as illustrated in FIG. 2 or FIG. 6, and can be executed by a control device 200 as illustrated in FIG. 5. The control device 200 can be achieved by hardware or software, and can be a part of the electronic device 100 and set inside of the electronic device 100.

As illustrated in FIG. 1, the method for controlling display refresh rate can include actions at following blocks.

At block 101, the method may include judging whether there is at least one foreground application currently running is a predefined application of a white list. When there is at least one foreground application is the predefined application of the white list, the process turns to block 102, when there is no foreground application is the predefined application of the white list, the process ends or turns to block 104.

In one implementation, the white list includes application identifiers of all of the predefined applications, at the block 101, the method may include detecting which foreground application is/are running currently, and obtaining an application identifier of each foreground application running currently, and determining one foreground application is the predefined application of the white list when the application identifier of the application matches one application identifier of the white list; and determining one foreground application is not the predefined application of the white list when the application identifier of the application does not match any application identifiers of the white list. Thus, to judge whether there is at least one foreground application currently running is the predefined application of the white list.

In some implementations, at block 101, the method may further include judging whether a work mode of a display screen 412 (as shown in FIG. 6) of the electronic device 100 is a video mode, if the work mode of the display screen 412 is the video mode, then judging whether there is at least one foreground application currently running is a predefined application of a white list. That is, in some implementation, judging whether there is at least one foreground application currently running is a predefined application of a white list and its following steps can be executed only when the work mode of the display screen 412 is the video mode.

In order to understand the present disclosure easier, the electronic device 100 is installed with an operating system (e.g., an Android system) as an example, and a process from generating a display frame to displaying the display frame of the Android system is described as follow. FIG. 2 is a schematic diagram which illustrates a display process of the electronic device 100 and illustrates partial hardware and firmware structure of the electronic device 100.

At first, in an application layer, each application executes an image render operation individually according to corresponding application design condition of each application itself, therein, the application design condition usually is decided by the corresponding installation package of the application. After the image render operation is finished, each application transmits the rendered image to a display composition module 10 to execute an image compose operation. The display composition module 10 can be a surface flinger.

In an application framework layer of the Android system, there are three frame buffers F1, the three frame buffers F1 may be used circularly. The display composition module 10 may find an idle frame buffer F1, and at the frame buffer F1, the display composition module 10 may execute the image compose operation to overlap the rendered image of each application based on application configuration information, such as which image should be put in bottom, which image should be put in top, which image should adopt transparent effect, thus to obtain a display frame (a picture to be displayed) would to be displayed.

Finally, in a kernel layer of the Android system, the display frame to be displayed may be transmitted to a display assembly 30 via a mobile display process module 20, therein, the display assembly 30 may include a display controller 4091 (as shown in FIG. 2 or FIG. 6) and a display screen 412 (as shown in FIG. 2 or FIG. 6). The display frame may be displayed on the display screen 412. The type of the display screen 412 can be liquid crystal display, an organic light emitting diode display, here does not make limitations. Commonly, the display screen 412 is refreshed with its greatest refresh rate, such as 60 HZ.

The display screen 412 may work in a certain work mode, the work mode of the display screen 412 may include a video mode and a command mode. The video mode also can be named as a DSI mode and the command mode also can be named as a DCS mode.

Figure 3:
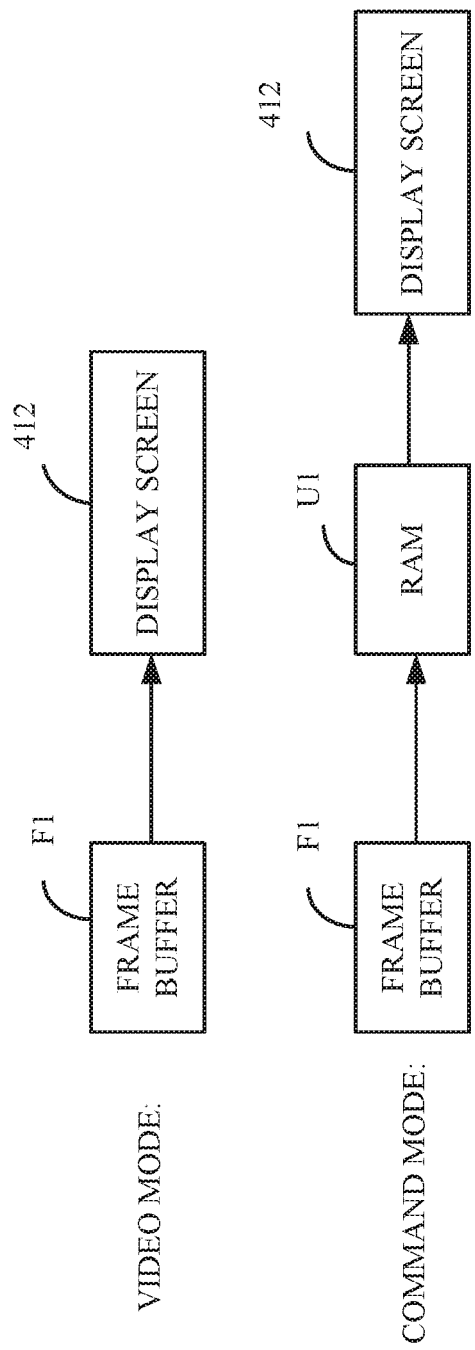
FIG. 3 is a schematic diagram illustrating display data transmission processes when a display screen works in a video mode and a command mode, according to an implementation of the disclosure.

FIG. 3 illustrates display data transmission processes when the display screen 412 works in the video mode and the command mode. As illustrated in FIG. 3, the video mode is designed for a refresh operation of a display framework in which the display screen 412 does not equip a frame buffer unit U1 (as shown in FIG. 3) to store the frame temporarily. Therein, the frame buffer unit U1 is a random-access memory (RAM). In the video mode, the display controller 4091 needs to refresh the display screen 412 continuously, because do not use dedicated data signal to transmit synchronization information, control signals and RGB image data are transmitted via a mobile industry processor interface (MIPI) bus in the form of telegrams. Due to the display controller 4091 needs to refresh the display screen 412 periodically, the display screen has no necessary to equip the frame buffer unit U1, the display controller 4091 controls the frame buffer F1 to send display frame data to be displayed on the display screen 412 at the frequency corresponded to the refresh rate of the display screen 412.

The command mode is designed for a refresh operation of a display framework in which the display screen 412 equips the frame buffer unit U1 to store the frame temporarily, the display controller 4091/main controller sends the data to be displayed in the frame buffer F1 to the frame buffer unit (RAM) U1 of the display screen 412 only when it is necessary to update the display image. At other times, the display controller 4091 controls the display screen 412 to obtain data from the frame buffer unit (RAM) U1 and display the data. In the command mode, MIPI bus controller transmits the image data to the display screen 412 by using display command telegrams. The frame buffer unit U1 of the display screen 412 stores all of the image data. The display controller 4091 controls the display screen 412 to obtain the image data from the frame buffer unit U1 once the image data is stored into the frame buffer unit U1, and displays them on the display screen 412 automatically. In this situation, the MIPI bus controller does not need to refresh the display screen 412 periodically.

In the present disclosure, the method for controlling the display refresh rate is mainly applied to the display screen works in the video mode.

In the image render, compose and refresh display process, there are three kinds of frame rate: a render frame rate, a compose frame rate and a refresh rate.

Therein, the render frame rate is the frame rate at which the display composition module 10 is triggered to execute the compose operation, after the application has rendered the image, the render frame rate also can be understood as the number of times that the application renders the image in unit time (for example, one second).

The compose frame rate is the frame rate of composing the rendered images of each application into one picture to be displayed.

The refresh rate is the frame rate that the picture refreshed by the display screen 412 of the electronic device 100.

In the present disclosure, the method for controlling the display refresh rate mainly relates to the refresh display operation in the above-mentioned display process of the picture to be displayed.

In the actions of the block 101, the predefined applications of the white list are those applications whose display refresh rate need be reduced, thus the white list prestores the predefined applications whose display refresh rate need be reduced and predefined refresh rates corresponding to the predefined applications. In detail, the white list may store relationships between the application identifier and the refresh rate of each predefined application. Usually, the display screen 412 of the electronic device 100 are refreshed at the refresh rate of 60 HZ, however, some applications may achieve the requirements of displaying the picture naturally and smoothly without need such a high refresh rate. For example, a video type application, a reader type application, or social type applications including instant messaging applications. Thus, these applications and the corresponding predefined refresh rate can be prestored in the white list, when detecting the electronic device 100 runs the application(s) of the white list, then setting a target refresh rate of the display screen 412 according to the predefined refresh rate of the running application(s). Therein, the predefined refresh rate corresponding to the application may be the minimum refresh rate of the display screen 412 which satisfies the natural and smoothness requirements when the display screen 412 displays the pictures/images of the application, and the minimum refresh rate of the display screen 412 can be determined by experimental data.

At block 102, the method may include obtaining the predefined refresh rate of the at least one foreground application when there is at least one foreground application currently running is the predefined application of the white list, determining the target refresh rate of the display screen 412 according to the predefined refresh rate of the at least one foreground application. In one implementation, obtaining the predefined refresh rate of the at least one foreground application when there is at least one foreground application currently running is the predefined application of the white list may include: obtaining the predefined refresh rate of the at least one foreground application when there is at least one foreground application currently running is the predefined application of the white list and the work mode of the display screen 412 of the electronic device 100 is the video mode.

In one implementation, obtaining the predefined refresh rate of the at least one foreground application may include: determining the application identifier of the at least one foreground application, and obtaining the predefined refresh rate corresponding to the application identifier from the white list.

Therein, a number of the at least one foreground application which is the predefined application of the white list may be one or more. When the number of the at least one foreground application is one, determining the target refresh rate of the display screen 412 according to the predefined refresh rate of the at least one foreground application may include: setting the predefined refresh rate of the one foreground application as the target refresh rate of the display screen. When the number of the at least one foreground application is more than one, determining the target refresh rate of the display screen 412 according to the predefined refresh rate of the at least one foreground application may include: determining the target refresh rate of the display screen 412 according to the predefined refresh rate of each foreground application and application attribute of each foreground application. Therein, the application attribute includes application priority and/or application type. Namely, the application attribute of each application indicates which priority the application is, or which type the application is.

Therein, determining the target refresh rate of the display screen 412 according to the predefined refresh rate of each foreground application and application attribute of each foreground application may include: determining the predefined refresh rate of the foreground application whose application priority is highest or whose application type is a predefined type, as the target refresh rate of the display screen 412.

For example, when determining the predefined refresh rate of the foreground application whose application priority is highest as the target refresh rate of the display screen 412, if there are two foreground applications are the predefined application of the whitelist, and the application priority of foreground application 1 is higher than that of foreground application 2, thus the target refresh rate of the display screen 412 can be determined as the predefined refresh rate of the foreground application 1. For other example, when determining the predefined refresh rate of the foreground application whose application type is the predefined type as the target refresh rate of the display screen 412, if there are two foreground applications are the predefined application of the white list, and the type of the foreground application 1 is a video type, and the type of the foreground application 2 is a reader type, and if the video type is the predefined type, thus the target refresh rate of the display screen 412 can be determined as the predefined refresh rate of the foreground application 1.

Therein, after the target refresh rate of the display screen 412 is determined, then the display refresh operation of the display screen 412 can be executed according to the target refresh rate of the display screen 412.

The method provided in this implementation may further include the following operations/actions: setting the render frame rate of the foreground application as the same as the target refresh rate of the display screen if the render frame rate of the foreground application is greater than the target refresh rate of the display screen. The benefit of doing that setting is: through making the render frame rate of the foreground application to less than or equal to the target refresh rate of the display screen, so as to avoid the image rendered by the application to occupy resources of the electronic device 100 and consume unnecessary power when the rendered image cannot be refreshed at its render frame rate.

At block 103, the method may include controlling the frame buffer F1 to send the display frame data to be displayed on the display screen 412 at the same frequency as the target refresh rate. In some implementations, the block 103 may detail include: controlling the frame buffer F1 to send the display frame data to be displayed to the display screen 412 at the same frequency as the target refresh rate via a display drive module. Therein, the display drive module can be a display drive circuit including a thin-film transistor (TFT) drive array.

After determining the target refresh rate of the display screen 412, a main controller (not shown, such as the CPU 402 as shown in FIG. 6) of the electronic device 100 controls the frame buffer F1 to send the display frame data to be displayed to the display screen 412 at the same frequency as the target refresh rate via a display drive module, thus to cause the display screen to display and refresh the display frame date to be displayed at the target refresh rate. In this step, compared with the prior art in which the display screen is refreshed at a fixed maximum refresh rate, the power consumption of the display screen 412 of the electronic device 100 can be reduced. In some implementations, sending the display frame data to the display screen 412 may include: sending the display frame data to the display controller 4091, and the display controller 4091 then transmits the display frame data to the display screen 412 when receiving the display frame data to be displayed.

At block 104, the method may include setting the display refresh rate of the display screen 412 to a first predefined refresh rate when there is no foreground application currently running is a predefined application of a white list.

In some implementations, the first predefined refresh rate may be the maximum display refresh rate, such as 60 HZ. For applications that are not in the white list, such as game applications that require a high refresh rate, can be refreshed at the maximum refresh rate.

According to the method for controlling the display refresh rate of the electronic device 100 provided by the present disclosure, through detecting whether there is at least one foreground application currently running is the predefined application in a white list, obtaining the predefined refresh rate corresponding to the at least one foreground application in the white list if there is at least one foreground application is the predefined application in the white list, and determining a target refresh rate of the display screen 412 of the electronic device 100 according to the predefined refresh rate corresponding to the foreground application. Therein, the work mode of the display screen 412 is a video mode, through controlling the frame buffer F1 by the display drive module to send the display frame data to be displayed to the display screen 412 at the same frequency as the target refresh rate, the refresh rate of the display screen 412 of the electronic device 100 may be controlled suitably.

Figure 4:
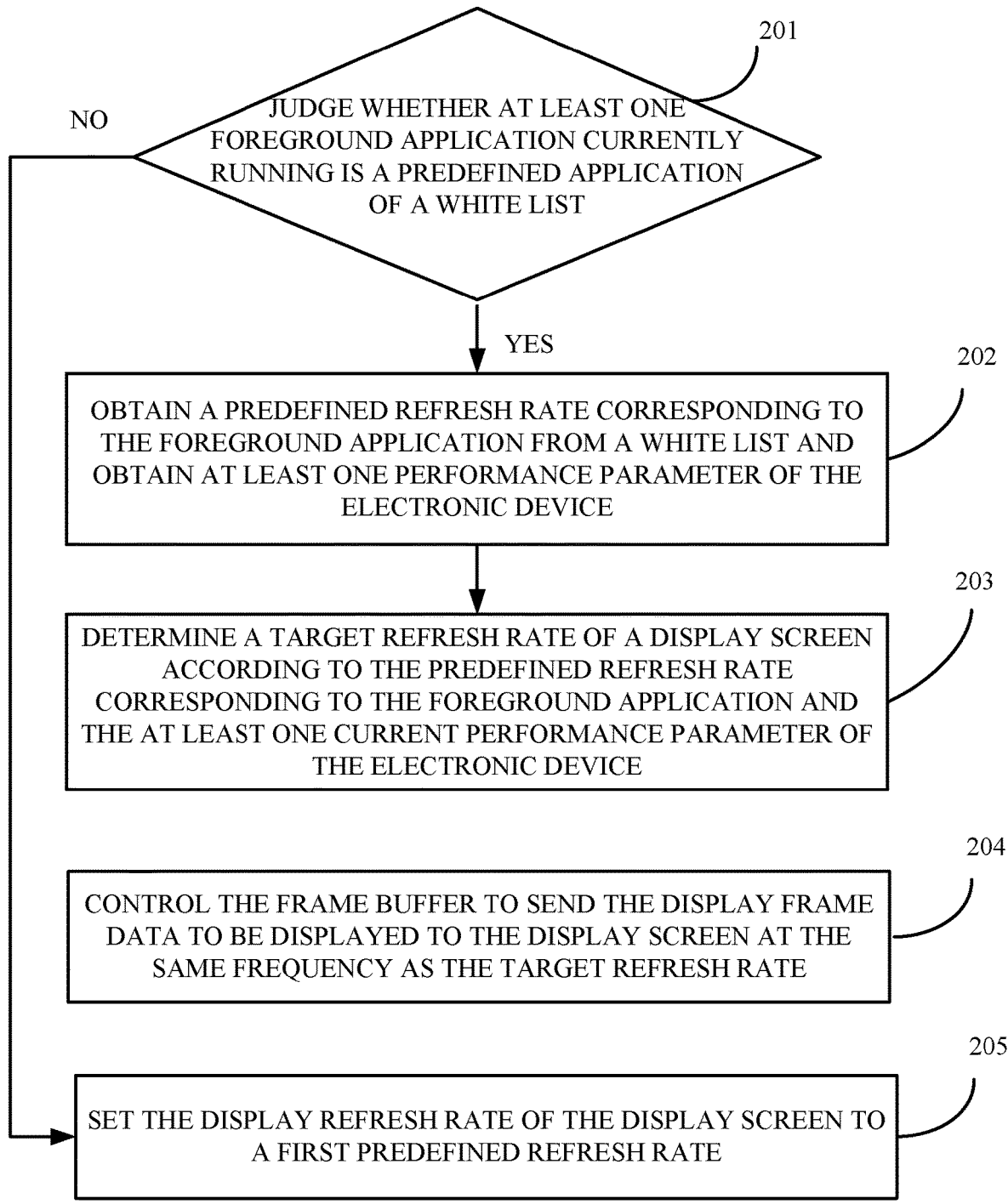
FIG. 4 is a flowchart illustrating a method for controlling display refresh rate, according to another implementation of the disclosure.

FIG. 4 illustrates a flowchart of a method for controlling display refresh rate of an electronic device, provided by another implementation of the disclosure. As illustrated in FIG. 4, the method for controlling display refresh rate can include following blocks:

At block 201, the method may include judging whether there is at least one foreground application currently running is a predefined application of a white list. When there is at least one foreground application is the predefined application of the white list, the process turns to block 202, when there is no foreground application is the predefined application of the white list, the process ends or turns to block 205.

At block 202, the method may include obtaining a predefined refresh rate corresponding to the foreground application from the white list and obtaining at least one performance parameter of the electronic device 100 currently. The at least one performance parameter includes at least one of a battery level, a memory usage, and a temperature of the electronic device 100, a frequency of a central processing unit (CPU), a work load of the CPU, a frequency of an image processor and a work load of the image processor.

At block 203, the method may include determining a target refresh rate of the display screen 412 according to the predefined refresh rate corresponding to the foreground application and the at least one current performance parameter of the electronic device 100.

For example, if the at least one performance parameter is the battery level of the electronic device 100, determining a target refresh rate of the display screen 412 according to the predefined refresh rate corresponding to the foreground application and the current performance parameter of the electronic device 100 may include: if a ratio of the current battery level to a preset maximum battery level is greater than or equal to a first preset ratio, then determining the target refresh rate of the display screen 412 according to the predefined refresh rate corresponding to the foreground application, therein, the first preset ratio is less than 1; and if the ratio of the current battery level to the preset maximum battery level is less than the first preset ratio, then determining the target refresh rate of the display screen 412 based on a first preset percentage value of the predefined refresh rate corresponding to the foreground application; therein, the first set percentage value is less than 1. In some implementations, the first preset ratio can be 50% and the first preset percentage value can be 80%.

In some implementations, determining the target refresh rate of the display screen 412 according to the predefined refresh rate corresponding to the at least one foreground application may include: if the number of the at least one foreground application is one, then determining the predefined refresh rate of the foreground application as the target refresh rate of the display screen; if the number of the at least one foreground application is more than one, then determining an intermediate target refresh rate of the display screen 412 according to the predefined refresh rate of each foreground application and the application attribute of each foreground application, and setting the intermediate target refresh rate as the target refresh rate of the display screen 412. As described above, the application attribute may include application priority and/or application type. Namely, the application attribute of each application indicates which priority the application is, or which type the application is.

In some implementations, determining the target refresh rate of the display screen 412 based on the first preset percentage value of the predefined refresh rate corresponding to the at least one foreground application may include: if the number of the at least one foreground application is one, then determining the first preset percentage value of the predefined refresh rate of the foreground application as the target refresh rate of the display screen; if the number of the at least one foreground application is more than one, then determining an intermediate target refresh rate of the display screen 412 according to the predefined refresh rate of each foreground application and the application attribute of each foreground application, and setting the first preset percentage value of the intermediate target refresh rate as the target refresh rate of the display screen 412.

For example, if the at least one performance parameter includes at least one of the battery level, the memory usage, the temperature of the electronic device 100, the frequency of the CPU, the work load of the CPU, the frequency of the image processor and the work load of the image processor, determining the target refresh rate of the display screen 412 according to the predefined refresh rate corresponding to the foreground application and the current performance parameter of the electronic device 100 may include: if a ratio of a value of the performance parameter to a preset maximum performance parameter value is greater than or equal to a second preset ratio, then determining the target refresh rate of the display screen 412 based on a second preset percentage value of the predefined refresh rate corresponding to the foreground application; and if the ratio of the value of the performance parameter to the preset maximum performance parameter value is less than the second preset ratio, then determining the target refresh rate of the display screen 412 according to the predefined refresh rate corresponding to the foreground application. Therein, the second preset ratio and the second preset percentage value both are less than 1. In some implementations, the second preset ratio can be 50% and the second preset percentage value can be 80%.

In some implementations, determining the target refresh rate of the display screen 412 based on the second preset percentage value of the predefined refresh rate corresponding to the at least one foreground application may include: if the number of the at least one foreground application is one, then determining the second preset percentage value of the predefined refresh rate of the foreground application as the target refresh rate of the display screen; if the number of the at least one foreground application is more than one, then determining an intermediate target refresh rate of the display screen 412 according to the predefined refresh rate of each foreground application and the application attribute of each foreground application, and setting the second preset percentage value of the intermediate target refresh rate as the target refresh rate of the display screen 412.

In some implementations, determining the target refresh rate of the display screen 412 according to the predefined refresh rate corresponding to the at least one foreground application may include: if the number of the at least one foreground application is one, then determining the predefined refresh rate of the foreground application as the target refresh rate of the display screen; if the number of the at least one foreground application is more than one, then determining an intermediate target refresh rate of the display screen 412 according to the predefined refresh rate of each foreground application and the application attribute of each foreground application, and setting the intermediate target refresh rate as the target refresh rate of the display screen 412.

Which should be described is, the target refresh rate of the display screen 412 also can be determined according to the predefined rate of the at least one foreground application by combining at least one performance parameter.

At block 204, the method may include controlling the frame buffer F1 to send the display frame data to be displayed on the display screen 412 at the same frequency as the target refresh rate. In some implementations, the block 204 may include: controlling the frame buffer F1 to send the display frame data to be displayed to the display screen 412 at the same frequency as the target refresh rate via a display drive module.

In one implementation, the method further includes actions of block 205, in block 205, the method may include setting the display refresh rate of the display screen 412 to a first predefined refresh rate when there is no foreground application currently running is a predefined application of a white list.

The method provided in this implementation, by detecting the foreground application currently running and judging whether there is at least one foreground application is the predefined application of the white list, and if the foreground application is the predefined application of the white list, obtaining the corresponding predefined refresh rate of the foreground application in the white list and the current performance parameter of the electronic device 100, and determining the target refresh rate of the display screen according to the predefined refresh rate corresponding to the at least one foreground application and the current performance parameter of the electronic device 100, and controlling the frame buffer F1 to send the display frame data to be displayed to the display screen 412 at the same frequency as the target refresh rate. Because further considering the current performance parameters of the electronic device 100, the display refresh rate of the display screen 412 of the electronic device 100 can be determined more suitable.

Therein, the electronic device 100 can be a mobile phone, a tablet computer, and the like, the electronic device 100 can equip components as illustrated in FIG. 6. In other implementations, the electronic device 100 also can equip components that a common mobile phone or tablet computer equipped commonly, such as the CPU, the image processor, the display controller, the frame buffer as described above which are labeled or not labeled.

FIG. 5 is a block diagram of a control device 200 for controlling the display refresh rate. Therein, the control device 200 can be achieved by hardware or software, and can be integrated in the electronic device 100 as illustrated in FIG. 2. As illustrated in FIG. 5, the control device 200 includes a predefined application detecting unit 31, a first target refresh rate determining unit 32, and a display data transmitting unit 33.

The predefined application detecting unit 31 is used to judge whether there is at least one foreground application currently running is a predefined application of a white list.

In some implementations, the predefined application detecting unit 31 firstly judge whether a work mode of the display screen of the electronic device 100 is a video mode, if the work mode of the display screen 412 of the electronic device 100 is the video mode, if yes, then predefined application detecting unit 31 judges whether there is at least one foreground application currently running is a predefined application of a white list.

The first target refresh rate determining unit 32 is used to obtain the predefined refresh rate of the at least one foreground application when there is at least one foreground application currently running is the predefined application of the white list, and determine the target refresh rate of the display screen 412 according to the predefined refresh rate of the at least one foreground application.

In some implementations, the first target refresh rate determining unit 32 obtains the predefined refresh rate of the at least one foreground application and determine the target refresh rate of the display screen 412 according to the predefined refresh rate of the at least one foreground application only when the work mode of the display screen 412 is the video mode.

The display data transmitting unit 33 is used to control the frame buffer F1 to send the display frame data to be displayed to the display screen 412 at the same frequency as the target refresh rate via a display drive module.

Furthermore, when the number of the at least one foreground application is one, the first target refresh rate determining unit 32 determines the target refresh rate of the display screen 412 according to the predefined refresh rate of the at least one foreground application may include: the first target refresh rate determining unit 32 sets the predefined refresh rate of the foreground application as the target refresh rate of the display screen.

When the number of the at least one foreground application is more than one, the first target refresh rate determining unit 32 determines the target refresh rate of the display screen 412 according to the predefined refresh rate of the at least one foreground application may include: the first target refresh rate determining unit 32 determines the target refresh rate of the display screen 412 according to the predefined refresh rate of each foreground application and application attribute of each foreground application. Therein, the application attribute includes application priority and/or application type. Namely, the application attribute of each application indicates which priority the application is, or which type the application is.

In some implementations, the first target refresh rate determining unit 32 includes a predefined refresh rate obtaining sub-unit 321 and a target refresh rate determining sub-unit 322.

The predefined refresh rate obtaining sub-unit 321 is used to obtain a predefined refresh rate corresponding to the foreground application from the white list and obtain the current performance parameter of the electronic device. The performance parameter includes at least one of a battery level, a memory usage, and a temperature of the electronic device 100, a frequency of a central processing unit (CPU), a work load of the CPU, a frequency of an image processor and a work load of the image processor.

The target refresh rate determining sub-unit 322 is used to determine the target refresh rate of the display screen 412 according to the predefined refresh rate corresponding to the foreground application and the current performance parameter of the electronic device 100.

In one implementation, the performance parameter is the battery level of the electronic device 100, the target refresh rate determining sub-unit 322 is detailed used to: if a ratio of the current battery level to a preset maximum battery level is greater than or equal to a first preset ratio, then determines the target refresh rate of the display screen 412 according to the predefined refresh rate corresponding to the foreground application, therein, the first preset ratio is less than 1; and if the ratio of the current battery level to the preset maximum battery level is less than the first preset ratio, then determines the target refresh rate of the display screen 412 based on a first preset percentage value of the predefined refresh rate corresponding to the foreground application; therein, the first set percentage value is less than 1. In some implementations, the first preset ratio can be 50% and the first preset percentage value can be 80%.

In one implementation, the performance parameter includes at least one of the battery level, the memory usage, the temperature of the electronic device 100, the frequency of the CPU, the work load of the CPU, the frequency of the image processor and the work load of the image processor, the target refresh rate determining sub-unit 322 is further used to: if a ratio of a value of the performance parameter to a preset maximum performance parameter value is greater than or equal to a second preset ratio, then determines the target refresh rate of the display screen 412 based on a second preset percentage value of the predefined refresh rate corresponding to the foreground application; and if the ratio of the value of the performance parameter to the preset maximum performance parameter value is less than the second preset ratio, then determines the target refresh rate of the display screen 412 according to the predefined refresh rate corresponding to the foreground application. Therein, the second preset ratio and the second preset percentage value both are less than 1. In some implementations, the second preset ratio can be 50% and the second preset percentage value can be 80%.

As illustrated in FIG. 5, the control device 200 may further include a second target refresh rate unit 34, the second target refresh rate unit 34 is used to set the display refresh rate of the display screen 412 to a first predefined refresh rate when there is no foreground application currently running is the predefined application of the white list.

The control device 200 provided in this implementation, by detecting the foreground application currently running and judging whether there is at least one foreground application is the predefined application of the white list, and if the foreground application is the predefined application of the white list, obtaining the corresponding predefined refresh rate of the foreground application in the white list and the current performance parameter of the electronic device 100, and determining the target refresh rate of the display screen according to the predefined refresh rate corresponding to the at least one foreground application, and controlling the frame buffer F1 to send the display frame data to be displayed to the display screen 412 at the same frequency as the target refresh rate. Therein, the work mode of the display screen 412 is the video mode. According to the control device, the display refresh rate of the display screen 412 of the electronic device 100 can be controlled suitably.

Referring also to FIG. 6, a structure diagram of the electronic device 100 is illustrated. The electronic device 100 may include the control device 200 described in any implementations. As illustrated in FIG. 6, in one implementation, the electronic device 100 may include but not limited to: a memory 401, a central processing unit (CPU) 402. The memory 401 is used to store computer-executable program code, namely, instructions. The CPU 402 is used to obtain the computer-executable program code from the memory 401 to run program corresponding to the computer-executable program code, thus to execute the method for controlling display refresh rate of the electronic device as described above, for example: judging whether there is at least one foreground application currently running is a predefined application of a white list; obtaining the predefined refresh rate of the at least one foreground application when there is at least one foreground application currently running is the predefined application of the white list, determining the target refresh rate of the display screen according to the predefined refresh rate of the at least one foreground application; and controlling the frame buffer F1 to send the display frame data to be displayed to the display screen 412 at the same frequency as the target refresh rate via a display drive module. Obviously, the CPU 402 also can be instead by a micro-controller, a single-chip, a digital processing chip, and other processors.

The electronic device 100 further includes a peripheral interface 403, a Radio Frequency (RF) circuit 405, an audio circuit 406, a loudspeaker 411, a power management chip 408, an input/output (I/O) subsystem 409, the display screen (e.g., a touch screen) 412, other input/control assemblies 410, an external port 404, and other components. These components communicate with each other via one or more communication bus or signal lines 407.

It should be understood that, the electronic device 100 as illustrated in FIG. 6 is only an example and the electronic device 100 can include more or fewer components than that illustrated in FIG. 6. Two or more components as illustrated in FIG. 6 also can be integrated to one component, the components as illustrated in FIG. 6 also can be instead by other similar or different components. Each component as illustrated in FIG. 6 can be achieved as hardware, software, or a combination of hardware and software each including one or more signal processing/specific integrated circuit.

The electronic device 100, provided in one implementation, for controlling the display refresh rate would be detail described as follows. In one implementation, the electronic device 100 is taken as a mobile phone for example.

The memory 401 can be accessed by the CPU 402, the peripheral interface 403 and other components. The memory 401 may include a high speed semirandom access memory, and may further include non-volatile memory, such as one or more disk storage, flash memories, or solid-state storage.

The peripheral interface 403 may connect an input/output peripheral device to the CPU 402 and the memory 401.

The I/O subsystem 409 may connect input/output peripheral components of the electronic device, such as the display screen 412, and other input/control assemblies 110 to the peripheral interface 403. The I/O subsystem 409 may include a display controller 4091 and one or more input controller 4092 for controlling the other input/control assemblies 410. Therein, the one or more input controller 4092 may receive electrical signals from the other input/control assemblies 410 or transmit the electrical signals to the other input/control assemblies 410. The other input/control assemblies 410 may include but not limited to: physical buttons (push buttons or rocker arm buttons), dial plates, slide switches, joysticks, and wheel buttons. It should be noted that, the input controller 4092 may connect to any one of a keyboard, an infrared port, a universal serial bus, and a pointing device such as a mouse.

The display screen 412 is a touch screen which is an input and output interface between the electronic device 100 and the user, the touch screen 1 may display visual content to the user, the visual content may include images, texts, icons, videos, etc.

The display controller 4091 of the I/O subsystem 409 may receive electrical signals from the display screen 412 or transmit the electrical signals to the display screen 412. The touch screen is used to detect touch operations on it, the display controller 4091 is used to convert the detected touch operations to interactions with interface objects displayed on the display screen 412, namely achieve human-machine interactions. The interface objects displayed on the display screen 412 can be a game icon for running the game, a network icon for connecting to a corresponding network, etc. It should be noted that, the pointing device further can include an optical mouse, the optical mouse may be an extended portion of a touch-sensitive surface without displaying the visual content, or a touch-sensitive surface formed by the display screen 412.

The RF circuit 405 is used to establish a communication between the mobile phone and a wireless network, thus to achieve data transmission and receiving between the mobile phone and the wireless network. For example, sending or receiving message or e-mail. In detail, the RF circuit 405 is used to transmit or receive RF signals. The RF signal is also named as electromagnetic signals, the RF circuit 405 converts electrical signals to the electromagnetic signals or converts the electromagnetic signals to the electrical signals, and communicates with the wireless network or other devices via the electromagnetic signals. The RF circuit 405 may include a number of circuits for executing the function, the number of circuits include but not limited to: an antenna system, a RF transceiver, one or more amplifiers, a tuner, one or more oscillators, a digital signal processor, a CODEC (coder and decoder) chipset, a subscriber identity module (SIM) card, etc.

The audio circuit 406 is used to receive audio data from the peripheral interface 403, convert the audio data to electrical signals, and transmit the electrical signals to the loudspeaker 411.

The loudspeaker 411 is used to restore audio signals received from the wireless network via the RF circuit 405 to voice signals, and output the voice signals to the user.

The power management chip 408 is used to supply power to the CPU 402, the I/O subsystem 409, and hardware connected by the peripheral interface 403.

In the implementation, the CPU 402 can execute the above methods described in FIGS. 1-4. Therefore, the electronic device 100 can control the display frame rate effectively by using the CPU 402 to execute any method for controlling the display refresh rate.

Implementations within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design.

In one implementation, the tangible and/or non-transitory computer-readable storage media can be the memory 401, and the computer-executable instructions or data structures stored in the tangible and/or non-transitory computer-readable storage media can be executed by the CPU 402 to cause the CPU 402 to execute the above method for controlling the display refresh rate as illustrated in FIGS. 1-4.

Therein, the computer can be the electronic device 100, and can be a desktop computer, a mobile phone, a tablet computer, a portable computer, etc.

The electronic device 100 may execute the method provided by any implementations described above, and include corresponding function components to execute the method described above. The electronic device 100 first judges whether there is at least one foreground application currently running is a predefined application of a white list; then obtains the predefined refresh rate of the at least one foreground application when there is at least one foreground application currently running is the predefined application of the white list, determines the target refresh rate of the display screen according to the predefined refresh rate of the at least one foreground application; and controls the frame buffer F1 to send the display frame data to be displayed to the display screen 412 at the same frequency as the target refresh rate via the display drive module, thus to control the display refresh rate of the display screen 412 of the electronic device suitably.

The foregoing description merely depicts some exemplary implementations of the disclosure and thus is not intended as limiting the scope of the disclosure. Any variations or substitutions that can be readily thought of by a person skilled in the art in light of the scope of the disclosure shall all be covered within the protection of the disclosure. Therefore, the scope of the disclosure is defined only by the appended claims.

What is claimed is:

1. A method for controlling a display refresh rate of an electronic device, comprising:
   when one or more foreground applications running are predefined applications of a white list, obtaining a predefined refresh rate of the one or more foreground applications and determining a target refresh rate of a display screen of the electronic device based on the predefined refresh rate of the one or more foreground applications, wherein the predefined applications of the white list are applications having predefined display refresh rates that are lower than a usual display refresh rate of the display screen;
   controlling a frame buffer of the electronic device to send display frame data to be displayed on the display screen at the same frequency as the target refresh rate; and
   when a render frame rate of the one or more foreground applications is greater than the target refresh rate of the display screen, setting the render frame rate of the one or more foreground applications the same as the target refresh rate.

2. The method of claim 1, wherein determining the target refresh rate of the display screen of the electronic device based on the predefined refresh rate of the one or more foreground applications comprises:
   when a number of the one or more foreground applications is one, setting the target refresh rate of the display screen as the predefined refresh rate of the foreground application.

3. The method of claim 1, wherein obtaining the predefined refresh rate of the one or more foreground applications and determining the target refresh rate of the display screen of the electronic device based on the predefined refresh rate of the one or more foreground applications comprises:
   obtaining the predefined refresh rate corresponding to the one or more foreground applications from the white list and obtaining at least one performance parameter of the electronic device; and
   determining the target refresh rate of the display screen according to the predefined refresh rate corresponding to the one or more foreground applications and the at least one performance parameter of the electronic device.

4. The method of claim 3, wherein the at least one performance parameter comprises a battery level of the electronic device, and determining the target refresh rate of the display screen according to the predefined refresh rate corresponding to the one or more foreground applications and the at least one performance parameter of the electronic device comprises:
   determining the target refresh rate of the display screen according to the predefined refresh rate corresponding to the one or more foreground applications when a ratio of a current battery level to a preset maximum battery level is greater than or equal to a first preset ratio; and
   determining the target refresh rate of the display screen based on a first preset percentage value of the predefined refresh rate corresponding to the foreground application when the ratio of the current battery level to the preset maximum battery level is less than the first preset ratio, wherein the first preset ratio and the first preset percentage value are less than 1.

5. The method of claim 3, wherein the at least one performance parameter comprises at least one of a battery level, a memory usage, a temperature of the electronic device, a frequency of a CPU of the electronic device, a work load of the CPU, a frequency of an image processor of the electronic device, or a work load of the image processor, and determining the target refresh rate of the display screen according to the predefined refresh rate corresponding to the one or more foreground applications and the at least one performance parameter of the electronic device comprises:
   determining the target refresh rate of the display screen based on a second preset percentage value of the predefined refresh rate corresponding to the foreground application when a ratio of a value of the at least one performance parameter to a preset maximum performance parameter value is greater than or equal to a second preset ratio, wherein the second preset ratio and the second preset percentage value are less than 1; and
   determining the target refresh rate of the display screen according to the predefined refresh rate corresponding to the foreground application when the ratio of the value of the at least one performance parameter to the preset maximum performance parameter value is less than the second preset ratio.

6. The method of claim 1, wherein when the one or more foreground applications running are the predefined applications of the white list, obtaining the predefined refresh rate of the one or more foreground applications and determining the target refresh rate of the display screen of the electronic device based on the predefined refresh rate of the one or more foreground applications comprises:
   when the one or more foreground applications running are the predefined applications of the white list and a work mode of the display screen is a video mode, obtaining the predefined refresh rate of the one or more foreground applications and determining the target refresh rate of the display screen of the electronic device according to the predefined refresh rate of the one or more foreground applications.

7. The method of claim 1, further comprising:
   prior to obtaining the predefined refresh rate of the one or more foreground applications and determining the target refresh rate of the display screen of the electronic device based on the predefined refresh rate of the one or more foreground applications, judging whether the one or more foreground applications currently running are the predefined applications of the white list.

8. The method of claim 7, wherein the white list comprises application identifiers of the predefined applications, and judging whether the one or more foreground applications currently running are the predefined applications of the white list comprises:
   detecting currently running foreground applications;
   obtaining an application identifier of each of the currently running foreground applications;
   determining a foreground application is the predefined application of the white list when an application identifier of the foreground application matches an application identifier of the white list; and
   determining the foreground application is not the predefined application of the white list when the application identifier of the foreground application does not match any application identifier of the white list.

9. The method of claim 1, further comprising:
setting the display refresh rate of the display screen to a first predefined refresh rate when no foreground application currently running is the predefined applications of the white list.

10. An electronic device, comprising:
a display screen;
a processor; and
a memory storing a plurality of instructions, the plurality of instructions being executed by the processor and causing the processor to:
when one or more foreground applications running are predefined applications of a white list,
obtain a predefined refresh rate of the one or more foreground applications and determine a target refresh rate of the display screen of the electronic device based on the predefined refresh rate of the one or more foreground applications,
wherein the predefined applications of the white list are applications having predefined display refresh rates that are lower than a usual display refresh rate of the display screen; control a frame buffer of the electronic device to send display frame data to be displayed on the display screen at the same frequency of the target refresh rate; and
when a render frame rate of the one or more foreground applications is greater than the target refresh rate of the display screen, set the render frame rate of the one or more foreground applications the same as the target refresh rate.

11. The electronic device of claim 10, wherein the plurality of instructions that cause the processor to determine the target refresh rate of the display screen of the electronic device based on the predefined refresh rate of the one or more foreground applications cause the processor to:
when a number of the one or more foreground applications is one, set the target refresh rate of the display screen as the predefined refresh rate of the foreground application.

12. The electronic device of claim 10, wherein the plurality of instructions that cause the processor to obtain the predefined refresh rate of the one or more foreground applications and determine the target refresh rate of the display screen of the electronic device according to based on the predefined refresh rate of the one or more foreground applications cause the processor to:
obtain the predefined refresh rate corresponding to the one or more foreground applications from the white list and obtain one performance parameter of the electronic device; and
determine the target refresh rate of the display screen according to the predefined refresh rate corresponding to the one or more foreground applications and the one performance parameter of the electronic device.

13. The electronic device of claim 12, wherein the one performance parameter comprises a battery level of the electronic device, and the plurality of instructions that cause the processor to determine the target refresh rate of the display screen according to the predefined refresh rate corresponding to the one or more foreground application and the one performance parameter of the electronic device cause the processor to:
determine the target refresh rate of the display screen according to the predefined refresh rate corresponding to the one or more foreground applications when a ratio of a current battery level to a preset maximum battery level is greater than or equal to a first preset ratio; and determine the target refresh rate of the display screen based on a first preset percentage value of the predefined refresh rate corresponding to the foreground application when the ratio of the current battery level to the preset maximum battery level is less than the first preset ratio, wherein the first preset ratio and the first preset percentage value are less than 1.

14. The electronic device of claim 12, wherein the one performance parameter comprises one of a battery level, a memory usage, a temperature of the electronic device, a frequency of a CPU of the electronic device, a work load of the CPU, a frequency of an image processor of the electronic device, or a work load of the image processor, and the plurality of instructions that cause the processor to determine the target refresh rate of the display screen according to the predefined refresh rate corresponding to the one or more foreground applications and the one performance parameter of the electronic device causes the processor to:
determine the target refresh rate of the display screen based on a second preset percentage value of the predefined refresh rate corresponding to the one or more foreground applications when a ratio of a value of the one performance parameter to a preset maximum performance parameter value is greater than or equal to a second preset ratio, wherein the second preset ratio and the second preset percentage value are less than 1; and
determine the target refresh rate of the display screen according to the predefined refresh rate corresponding to the one or more foreground applications when the ratio of the value of the one performance parameter to the preset maximum performance parameter value is less than the second preset ratio.

15. The electronic device of claim 10, wherein the plurality of instructions that cause the processor to obtain the predefined refresh rate of the one or more foreground applications and determine the target refresh rate of the display screen of the electronic device according to the predefined refresh rate of the one or more foreground application, applications when the one or more foreground applications currently running are the predefined applications of the white list cause the processor to:
when the one or more foreground applications running are the predefined applications of the white list and a work mode of the display screen is a video mode, obtain the predefined refresh rate of the one or more foreground applications and determine the target refresh rate of the display screen of the electronic device according to the predefined refresh rate of the one or more foreground applications.

16. The electronic device of claim 10, wherein the plurality of instructions being executed by the processor further cause the processor to:
judge whether the one or more foreground applications currently running are the predefined applications of the white list.

17. The electronic device of claim 10, the plurality of instructions being executed by the processor further cause the processor to:
set a display refresh rate of the display screen to a first predefined refresh rate when no foreground application currently running is the predefined applications of the white list.

18. A non-transitory computer-readable storage medium, wherein the non-transitory computer-readable storage medium stores a plurality of instructions, when the plurality of instructions are executed by a computer, the computer is caused to:

when one or more foreground applications running are predefined applications of a white list, obtain a predefined refresh rate of at least the one or more foreground applications and determine a target refresh rate of a display screen based on the predefined refresh rate of the one or more foreground applications, wherein the predefined applications of the white list are applications having a predefined display refresh rate that is lower than a usual display refresh rate of the display screen;

control a frame buffer to send display frame data to be displayed on the display screen at the same frequency as the target refresh rate; and when a render frame rate of the one or more foreground applications is greater than the target refresh rate of the display screen, setting the render frame rate of the one or more foreground applications the same as the target refresh rate.

19. The method of claim 1, wherein the target refresh rate of the display screen is the predefined refresh rate of a foreground application of the one or more foreground applications having a highest application priority.

20. The electronic device of claim 10, wherein the target refresh rate of the display screen is the predefined refresh rate of a foreground application of the one or more foreground applications having a highest application priority.

* * * * *